(12) United States Patent
Pedersoli

(10) Patent No.: US 9,721,244 B2
(45) Date of Patent: Aug. 1, 2017

(54) AUTHENTICATION SYSTEM

(71) Applicant: Maher Pedersoli, Tucson, AZ (US)

(72) Inventor: Maher Pedersoli, Tucson, AZ (US)

( * ) Notice: Subject to any disclaimer, the term of this patent is extended or adjusted under 35 U.S.C. 154(b) by 807 days.

(21) Appl. No.: 13/839,301

(22) Filed: Mar. 15, 2013

(65) Prior Publication Data

US 2014/0279560 A1 Sep. 18, 2014

(51) Int. Cl.
*G06Q 20/32* (2012.01)
*G06Q 20/38* (2012.01)

(52) U.S. Cl.
CPC ..... *G06Q 20/3276* (2013.01); *G06Q 20/3224* (2013.01); *G06Q 20/3823* (2013.01); *G06Q 20/38215* (2013.01)

(58) Field of Classification Search
CPC ........ G06Q 20/40; G06Q 20/20; G06Q 20/22; G06Q 20/3278; G06Q 20/36; G06Q 20/367; G06Q 30/0601
USPC ...... 705/44, 39, 21, 71, 26.1, 41, 16, 43, 67
See application file for complete search history.

(56) References Cited

U.S. PATENT DOCUMENTS

| | | | | |
|---|---|---|---|---|
| 2003/0028484 A1* | 2/2003 | Boylan | ................. | G06Q 20/02 705/40 |
| 2006/0173794 A1* | 8/2006 | Sellars | .................... | G06F 21/10 705/76 |
| 2006/0182282 A1* | 8/2006 | Negahdar | ............. | H04L 9/0825 380/277 |
| 2009/0187986 A1* | 7/2009 | Ozeki | ..................... | G06F 21/33 726/21 |
| 2012/0096277 A1* | 4/2012 | Perez Soria | ....... | G06Q 20/3274 713/179 |
| 2012/0151603 A1* | 6/2012 | Wang | ..................... | G06F 21/36 726/28 |

OTHER PUBLICATIONS

Langlotz, Tobias, and Oliver Bimber. "Unsynchronized 4D barcodes." Advances in Visual Computing. Springer Berlin Heidelberg, 2007. 363-374.*
Mobilo. "1D, 2D, & 3D Barcodes." Mar. 22, 2012. https://web.archive.org/web/20120328070723/http://www.mobiliodevelopment.com/1d-2d-3d-barcodes/ Accessed Aug. 31, 2015.*
Memeti, Jeton, et al. "Data transfer using a camera and a three-dimensional code." PIK-Praxis der Informationsverarbeitung und Kommunikation 36.1 (2013): 31-37.*
Mhaske-Dhamdhere, Vidya, et al. "3-D Graphical Password Used for Authentication." International Journal of Computer Technology and Applications 3.2 (2012).*

(Continued)

*Primary Examiner* — Minnah Seoh
*Assistant Examiner* — Jonathan Durant
(74) *Attorney, Agent, or Firm* — Kang S. Lim

(57) ABSTRACT

A two way authentication method, including receiving by an authentication server first encrypted data from a merchant computing device, receiving by the authentication server second encrypted data from a customer computing device, determining by the authentication server if the first encrypted data matches the second encrypted data, if the first encrypted data matches the second encrypted data, authenticating the customer computing device, if the first encrypted data does not matches the second encrypted data, not authenticating the customer computing device.

12 Claims, 9 Drawing Sheets

(56) References Cited

OTHER PUBLICATIONS

Morrison, Talyna. Codigo Cube Review—A Dice Game for Your Smartphone. Feb. 1, 2012. http://geekbeat.tv/codigo-cube-review-a-dice-game-for-your-smartphone/ Accessed Aug. 31, 2015.*
Nurwono, Kris Antoni Hadiputra, and Raymondus Kosala. "Color quick response code for mobile content distribution." Proceedings of the 7th International Conference on Advances in Mobile Computing and Multimedia. ACM, 2009.*

* cited by examiner

AUTHENTICATION SYSTEM

FIELD OF THE INVENTION

Embodiments generally relate to a system, and method using that system, to authenticate a person.

BACKGROUND OF THE INVENTION

Existing methods for authentication of a user to a physical place or to a digital contents such as online account, banking account at an ATM station, online payment for products or services, or offline payment for products or services involving the user having a user credentials known to two parties; a provider and the user. A known method that is widely used is authentication using a user name and password known to an authentication system such as a server and to a user. On the other hand, some methods involving a user carrying a physical card such as an ID card or credit card with encoded information on magnetic or smart ship placed on the card.

Other methods that are used as an added security to a user name and password are a programmable digital devices such as a fobs. Other methods that are gaining popularity involve using a mobile gadgets such a phone, tablet, or other electronic devices with an embedded operating system as a method for authentication. Existing methods that utilize mobile gadgets use a mobile device to display static textual or encoded contents such as barcode image to be scanned by a another party with a scanning device in order to perform authentication.

Other applications that relay on mobile devices to perform authentication use Near Field Communication (NFC) technologies. Such application is known to exist in one or more forms of Digital Wallet Mobile Applications, an example of such application is Google Wallet Application. Other mobile applications relay on GPS technology to authenticate a user for one or more forms of earn and access loyalty rewards at merchant's. Such methods are known as check-ins. Existing techniques for authentication methods mentioned above have been relatively easy to circumvent.

Certain prior art for authentication methods involves a user having credentials known to two parties, a provider and a user. A known methods are widely used and relay on a known user name and password to authenticate a user to a system such as a server.

When an existing credentials are known to multiple parties, it is static, and it can be vulnerable to skilled thieves who can gain unauthorized access to, physical places, data, or contents. Static digital contents used for user authentication is known to be vulnerable to skilled hackers.

Certain prior art for authentication methods involves a user carrying a physical card such as an identification card or credit card with encoded information on a magnetic strip or smart ship placed on the card.

Encoding credentials contents on physical objects such credit cards or identification cards for the purpose of authentication are known to be insecure ways of authentication. In many instances, a user is asked to carry multiple forms of identification cards. Authentication requires another person equipped with credit card or identification card reader to read and verify credentials. It is always assumed that a carrier of a credit card or identification card is the authorized owner. A stolen or lost credit card or identification card is high risk for unauthorized access by a unauthorized person. In some cases, a known pin or password must be remembered as an additional security measure. This method for authentication is known to have a high security risk. In addition, data encoded on a physical card is static, and require save guarding by the providing party.

Certain prior art for authentication methods involves a programmed digital device such as a fob. Fobs require a one time programming. A fob device is a measure for added security only. On its own, a fob device is not a stand alone solution for authentication. Fob devices carry no communication, and if lost, it require a physical replacement.

Certain prior art for authentication methods involves using mobile gadgets such smart phone, tablet, or other electronic devices with an embedded operating system. Existing methods that utilize mobile gadgets use a mobile device to display static textual or encoded contents such as barcode images. Barcode images are scanned by a second party with a scanning device in order to perform authentication.

Existing technologies that utilize mobile gadgets such smart phones relay on assigning an ID to a mobile user, and encode that ID in a form of a barcode, QR Code, or other images using a mobile application. This method relays on a second party with a scanning device to scan the barcode image displayed on the user's mobile device.

The scanning device is used to decode data and initialize a request in order to authorize a user for a purpose of a transaction. This method relay on static authentication ID assigned to a user. This authentication process is initiated by one scanning device typical in a physical place like a store. It is vulnerable to fraud because static authentication data can be copied or shared among multiple users with mobile devices. A skilled hacker can gain access to the scanning device, and as result can collect authentication data belonging to plurality of users. The scanning device requires a dedicated secure line of communication. All authentications request is initiated by the scanning device on the same line of communication. A skilled hacker can intercept the single line dedicated for authentication request, and as a result gain access to authentication data belonging to plurality of users.

A static barcode, QR Code, or other forms of images that are displayed by a mobile application and assigned to a user for a purpose of authentication, can be compromised by a dishonest user taking a screen shot of the displayed image and distribute to multiple users.

The system in this case relay on the honesty of users. Example of current applications in the market that relay on QR Code and barcode as a form of authentication on a mobile payment systems are LevelUp.com, Starbucks Mobile Application, and SquareUp.com. Each user in this case is assigned a static ID encoded as a qr-code or barcode image. The barcode or QR Code image is displayed by user's mobile devices. When a user wishes to use this mobile payment method at a merchant, the user is required to scan the barcode or QR Code image displayed on the user's mobile device. The scanner device at the merchant communicates with an authentication server and carries on the authentication process.

There is a need in the market for a better technology to facilitate authentication using mobile devices for mobile users for wide spectrum of needs.

SUMMARY OF THE INVENTION

Applicant's authentication is a two way authentication method that relay on a mobile user equipped with a mobile device. User's mobile device initiates and carries authentication request. A user equipped with a mobile device scans a 3D object displayed on a second device. The 3D object displayed on a second device is rotating at variable speed and direction. The rotation speed and direction of the 3D object is changing based on time and place. Location proximity of a mobile user to the second device is accomplished as it is requirement for a mobile user to perform a scanning of the 3D rotating object. displayed on the second device. On each surface of the 3D object data is encoded in the form of a barcode, QR Code, or an image.

Images, ID codes, and contents are dynamic and change every few seconds. Encrypted data that is specific to the time and place is sliced, and encoded as a barcode, QR Code, or images on each surface of a 3D moving object. The encoded data is valid for a very short time, and once expired, it cannot be replication never again.

Credentials are confirmed by using user's mobile device as an initiator and carrier for an authentication request. Applicant's method uses three way encryption methods. The encryption is done online using three devices, merchant computing device 110, customer computing device 150, and Authentication server 130. The encrypted data encoded and displayed as barcodes, QR codes, or images on each surface of a 3D image is known only to Authentication server 130 and computing device 110. The customer computing device 150 has no means to decrypt authentication data.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF PREFERRED EMBODIMENTS

The invention is described in preferred embodiments in the following description with reference to the FIGs., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in certain embodiments," and similar language throughout this specification may, but do not necessarily, all refer to the same embodiment. It is noted that, as used in this description, the singular forms "a," "an" and "the" include plural referents unless the context clearly dictates otherwise.

The described features, structures, or characteristics of the invention(s) may be combined in any suitable manner in one or more embodiments. In the following description, numerous specific details are recited to provide a thorough understanding of embodiments of the invention(s). One skilled in the relevant art will recognize, however, that the invention(s) may be practiced without one or more of the specific details, or with other methods, components, materials, and so forth. In other instances, well-known structures, materials, or operations are not shown or described in detail to avoid obscuring aspects of the invention.

Figure 1:
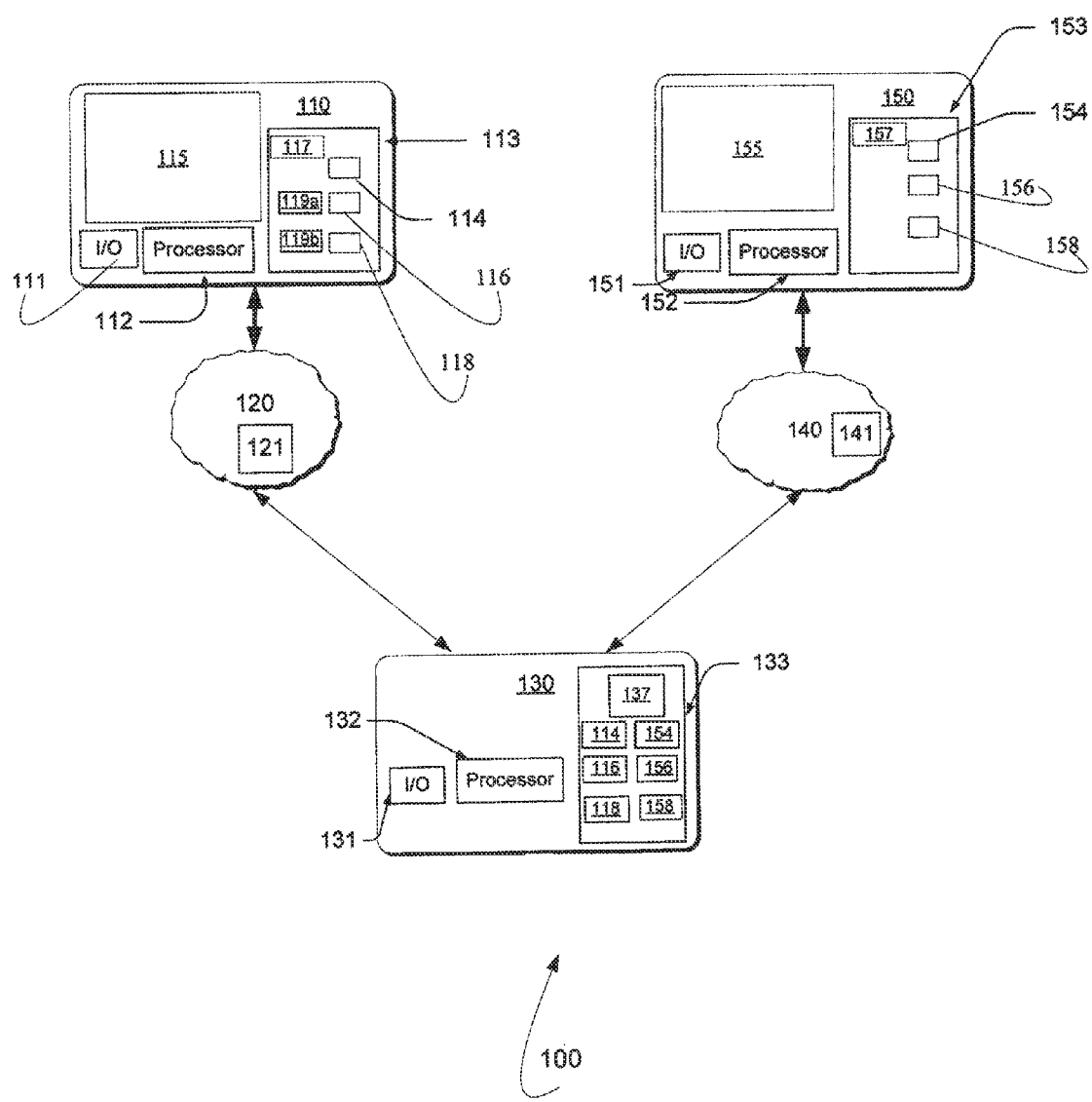
FIG. 1 illustrates an exemplary embodiment of Applicant's authentication network.

Referring to FIG. 1, a portion of Applicant's authentication network 100 is illustrated. In the illustrated embodiment of FIG. 1, Applicant's authentication network 100 comprises Applicant's authentication server 130 that is communicatively connected to a computing device 110 through a first communication fabric 120 and a computing device 150 through a second communication fabric 140.

In certain embodiments, computing device 110 is owned and operated by a place of business, such as and without limitation a retail store. In certain embodiments, computing device 150 is owned and operated by a person, such as and without limitation, a customer in a place of business.

As a general matter, Applicant's authentication server 130 and computing devices 110 and 150 each are independently selected from the group consisting of a mainframe computer, a personal computer, a workstation, a mobile telephone, a smart telephone, a personal digital assistant, a laptop, a set-top box, an MP3 player, an email enabled device, a tablet computer, a web enabled device, or other special purpose computer each having one or more processors.

For the sake of clarity, FIG. 1 shows computing devices 110 and 150 in communication with Applicant's authentication server 130. FIG. 1 should not be taken as limiting. Rather, in other embodiments a plurality of computing devices 150 owned and operated by potential customers/buyers, and a plurality of computing devices 110 owned and operated by businesses, are in communication with Applicant's authentication server 130.

Furthermore, for the sake of clarity, FIG. 1 shows a single authentication server 130. In other embodiments, Applicant's authentication network 100 comprises a plurality of Applicant's authentication server 130 disposed in a plurality of differing geographical regions.

As illustrated in FIG. 1, the communication fabrics 120 and 140 each comprise one or more switches 121 and 141, respectively. In certain embodiments, communication fabrics 120 and 140 are the same. In certain embodiments, at least one of the communication fabrics 120 and 140 comprises the Internet, an intranet, an extranet, a storage area network (SAN), a wide area network (WAN), a local area network (LAN), a virtual private network, a satellite communications network, an interactive television network, or any combination of the foregoing. In certain embodiments, at least one of the communication fabrics 120 and 140 utilizes either or both wired or wireless connections for the transmission of signals including electrical connections, magnetic connections, or a combination thereof. Examples of these types of connections include: radio frequency connections, optical connections, telephone links, a Digital Subscriber Line, or a cable link. Moreover, communication fabrics 120 and 140 utilize any of a variety of communication protocols, such as Transmission Control Protocol/Internet Protocol (TCP/IP), for example.

By way of illustration and not limitation, FIG. 1 illustrates computing device 110, the Applicant's authentication server 130, and computing device 150 as each comprising a processor 112, 132, and 152, respectively, a non-transitory computer readable medium 113, 133, and 153, respectively. FIG. 1 further illustrates computing device 110, the Applicant's authentication server 130, and computing device 150 as each comprising an input/output means 111, 131, and 151, respectively, such as a keyboard, a mouse, a stylus, touch screen, a camera, a scanner, or a printer.

Authentication server 130 and computing devices 110 and 150, further comprise computer readable program code 117, 137, 157, respectively, encoded in the computer readable medium 113, 133, and 153. Processors 112, 132, and 152, respectively utilize computer readable program code to operate computing devices 110, 130, and 150, respectively.

In the illustrated embodiment of FIG. 1, computing devices 110 and 150 comprise display screen/scanning device 115 and 155, respectively. In certain embodiments of Applicant's method, merchant computing device 110 displays on screen 115 a three-dimensional cube wherein one or more of the 6 faces recites encrypted QR Code data. In certain embodiments, customer computing device 150 utilizes scanning device 155 to capture one or more images of the three-dimensional cube displayed by merchant computing device 110.

In the illustrated embodiment of FIG. 1, computing devices 110 and 150 each comprise a unique public encryption key 114 and 154, respectively, and a unique private encryption key 116 and 156 encoded in computer readable media 113 and 153, respectively. In certain embodiments, computing devices 110 and 150 each comprise a unique identifier 118 and 158 encoded in computer readable media 113 and 153, respectively.

In the illustrated embodiment of FIG. 1, authentication server 130 comprises public encryption keys 114 and 154 encoded in computer readable medium 133. In the illustrated embodiment of FIG. 1, authentication server 130 further comprises private encryption keys 116 and 156 encoded in computer readable medium 133. In the illustrated embodiment of FIG. 1, authentication server 130 further comprises identities 118 and 158 encoded in computer readable medium 133.

Applicant's authentication process is a two way authentication that employs a user's mobile device, such as computing device 150, as the initiator for the authentication request. Location proximity is accomplished wherein the user must perform a scan using computing device 150 of an image, barcode, QR code, and/or combinations thereof, displayed on screen 115 of computing device 110. In certain embodiments, the image displayed comprises a three dimensional ("3D") rotating object. In certain embodiments, that 3D rotating object comprises a rotating cube 310 (FIG. 3). The rotating cube is rotating at specific direction at each time period, and at a rotation speed at each time period. The scanning device 150 in addition to scanning the image, barcode, and or qr code recited on each surface of the 3D object, it reads the rotation direction of 3D object, as well as the rotation speed of the 3D object. Both rotation speed and direction are two parameters that are known and recorded by device 110.

3D Objects in FIG. 3 is shown to be a cube, but without limitation, a 3D object can be a Rectangular Prisms, Triangular Prism, Hexagonal Prism, Triangular Pyramid, Tetrahedron, Cylinders, Cones, Spheres.

The encrypted data sliced and recited on each surface of the 3D rotating object as image, barcode, qr code and other contents displayed on screen 115 are dynamic and change every few seconds. The encrypted data sliced and recited on each surface of the 3D rotating object as image, barcode, qr code and other contents are only specific to the time and place, and cannot be replicated again.

Credentials are confirmed by using a user's mobile device 150 for the request for authentication. Applicant's system and method utilizes three way encryption methods (Encryption Server 130 to merchant computing device 110, merchant computing device 110 to customer computing device 150, and customer computing device 150 to Authentication server 130). The encryption is done online using all three computing devices. The encrypted data displayed on the QR code on the 3D object is only known to the authentication server 130 and the merchant computing device 110. The user has no means to decrypt that QR code data.

The data displayed on the QR code on the 3D image can have one or more of this: GPS data, transactional data, Device ID, Time stamps, Decoded messages only known to the Authentication server 130 and other data only known to the merchant computing device 110. In order to authenticate a user who performs a scan of the 3D object displayed on the screen 115 using computing device 150, the following must be accomplished: (1) the data originally known to the server, and encrypted and sent to computing device 110 to be sliced and recited on each surface of the 3D rotating object as image, barcode, qr code, and contents must match the data resident on authentication server 130 at that time, and (2) the user credentials 154, 156, and 158, must match the corresponding data known to the server at that time. (3) Rotation speed and direction of the 3D object as captured by user device 150 and known to merchant computing device must match based on the time of the capture the data known to the server 130 and device 110. The mobile user shares a private and a public key pair with the authentication server 130. The pair is used to encrypt and decrypt authentication data requests by a mobile user.

The private public keys are specific to each device and only can be used by one device at a time, and by one user at a time. If GPS is enabled, the GPS signal on computing device 110 and computing device 150 are compared for proximity as an added measure for security, but not a requirement.

Applicant's authentication process does not rely on one party to perform authentication. The user's mobile computing device 150, the merchant's computing device 110, and authentication server 130 share the responsibility of authentication. All three devices utilize private and public keys for encryption. The authentication server 130 and computing device 110 share a unique private and public key pair. Each computing device 150 and authentication server 130 share a unique private and public key pair.

All data said to exist and known to authentication server 130, computing device 110, and computing device 150, are unique to time and space, and it is impossible to recreate or to duplicate once it is expired. Such data exist for a very short period of time.

The QR code data is embedded on each surface of the 3D object. The frequency of the rotation is one aspect of the authorization. In addition, the rotation direction is another aspect of the authorization, and the sequence of the data read by the computing device 150 as a scanning device using the supplied application is a another aspect of the authorization process.

Applicant's authentication process can be used for a wide spectrum of mobile user authentication application such as Digital wallet Applications wherein no sensitive or credit card information is transported, stored, or shared with merchant or mobile user device. Authentication server 130 will authorize payment using a provider API such as Google Wallet, and PayPal API keys. Only confirmation or denial data are communicated to computing device 110 and computing device 150.

Using prior art systems and methods, authentication for online payment options was not available for offline stores at merchant locations. Using Applicant's system and method, merchants who have online stores can also offer a user an option to pay at a "bricks and mortar" location with the on-line payment options offered on the online store.

Other usage of Applicant's authentication process are digital identification such as insurance cards, employee cards, employee time cards, access to buildings, access to digital contents on server or computing device where a 3D object can be displayed in the place of a screen saver waiting for a mobile user to scan the rotating 3D object. Other usage can be for ATM access, where a user is required to be authorized by scanning the 3D rotating object recited on the ATM screen using a mobile device. Other added security such as pin and password can be used and integrated by a third party application as an extra but not required authentication method.

Figure 2:
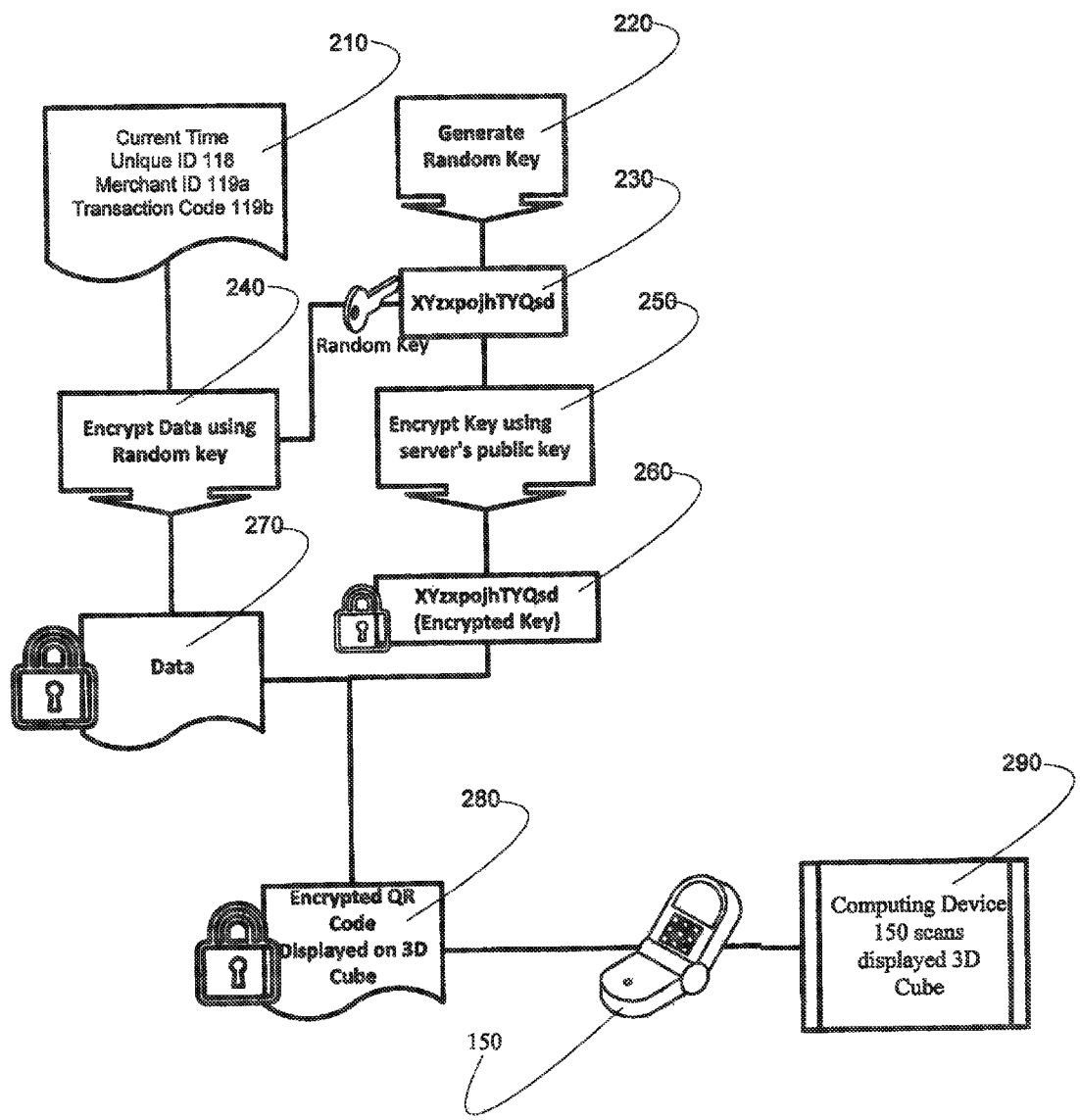
FIG. 2 summarizes a portion of Applicant's method wherein a merchant computing device forms certain first encrypted data.

FIGS. 2 through 7 summarize the steps of Applicant's method utilizing Applicant's authentication system 100 (FIG. 1). FIG. 2 summarizes the portion of Applicant's method wherein merchant computing device 110 forms encrypted data to be scanned by customer computing device 150 and subsequently provided to Applicant's authentication server 130. Referring to FIG. 2, a merchant's computing device 110 comprises data 210 which includes a current time, a unique identifier 118, a merchant ID 119*a*, and a transaction code 199*b*.

In step 220, merchant computing device 110 generates a random key 230. In step 240, merchant computing device 110 utilizes key 230 to encrypt the data 210 to generate encrypted data 270.

In step 250, merchant computing device 110 encrypts key 230 using a public key 114 to generate an encrypted key 260.

In step 280, merchant computing device 110 combines encrypted data 270 and encrypted key 260 and generates encrypted QR code 280. Further in step 280, merchant computing device 110 displays the encrypted data as QR Code 280 on a three dimensional ("3D") cube 310 (FIG. 3A).

In step 290, the user scans the image of the 3D cube displayed on screen 115 of merchant device 110.

Figure 3A:
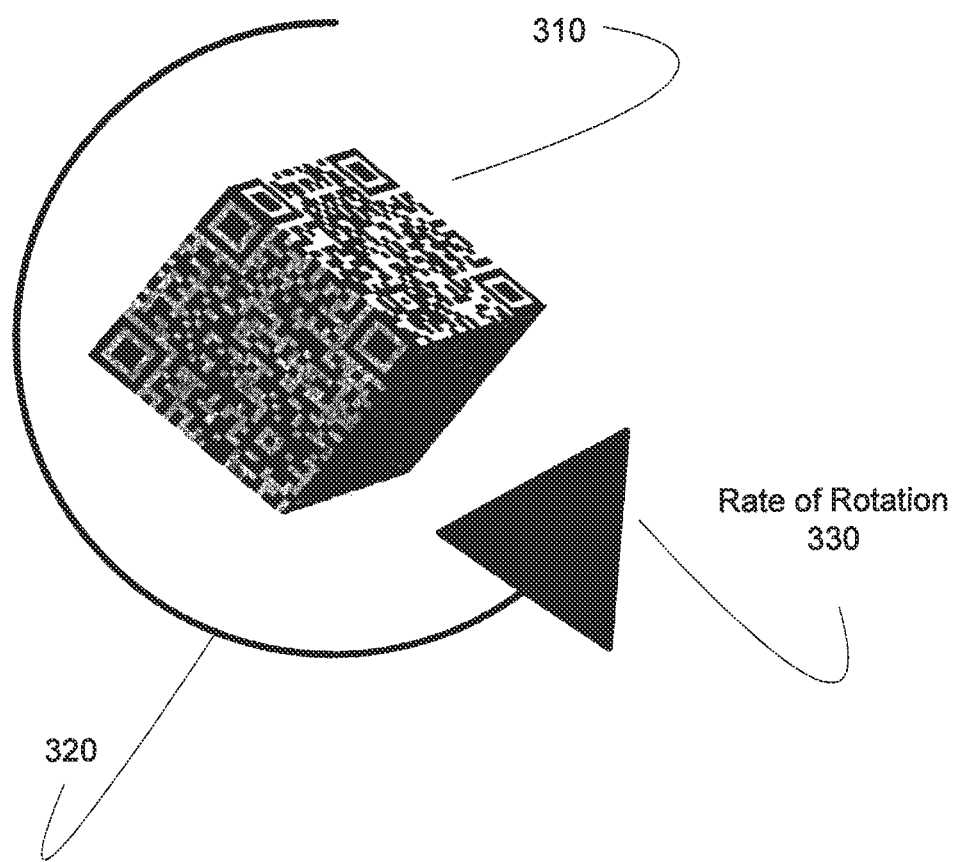
FIG. 3A illustrates a three-dimensional cube rotating in a direction and rotation speed wherein the 6 faces recite certain encrypted data encoded as a QR Code image.

Referring to FIG. 3A, in step 290 the user scans an image of cube 310 as that image rotates on screen 115. The information provided by customer computing device 150 to authentication server 130 includes the pixels comprising the data encoded on cube 310 in addition to the direction and speed of rotation of cube 310.

Figure 3B:
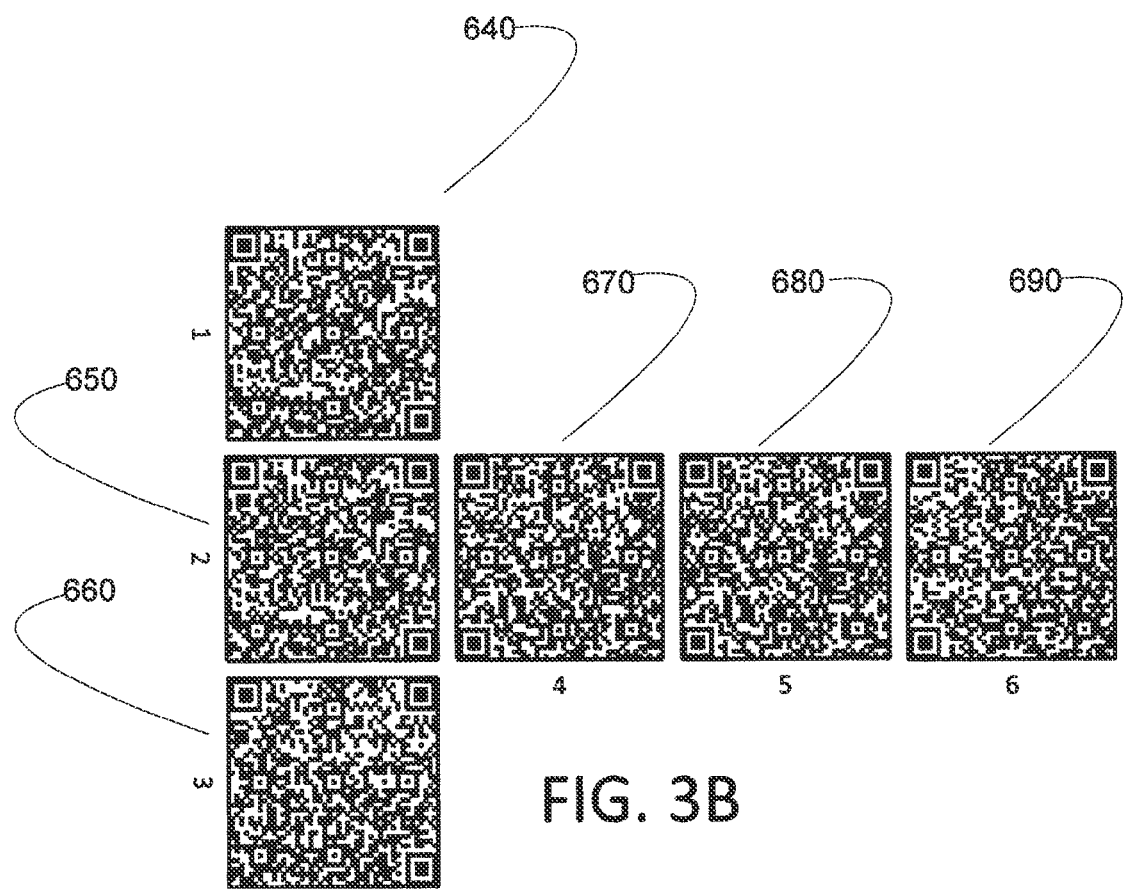
FIG. 3B illustrates a three-dimensional cube wherein the 6 faces are flattened. On each of the 6 flattened faces recite certain encrypted data encoded as a QR Code image.

FIG. 3B illustrates all six sides of cube 310. The data encoded in the QR Code disposed on faces 640, 650, 660, 670, 680, and 690, changes as cube 310 rotates. This being the case, the pixels comprising an image of each face 640, 650, 660, 670, 680, and 690, change as cube 310 rotates. The information provided by customer computing device 150 to authentication server 130 further includes the changes to the pixels captured by customer computing device 150, and the sequence of pixels captured by customer computing device 150.

Those skilled in the art will appreciate, that the sequence of pixel data captured by customer computing device 150 is a function of the direction of rotation of cube 310. If cube 310 rotates in a first direction, the sequence of faces presented comprises 640, 650, 660, 670, 680, and then 690. In contrast, if cube 310 is caused to rotate in a second and opposite direction, the sequence of faces presented comprises 690, 680, 670, 660, 650, and then 640.

Figure 3C:
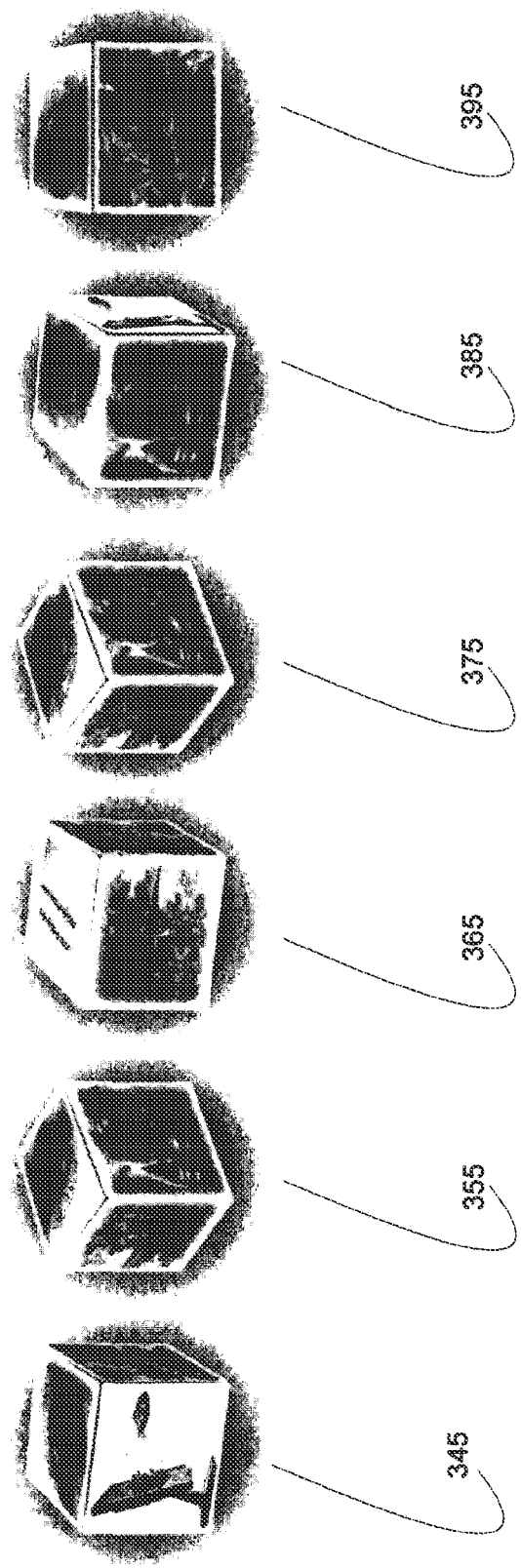
FIG. 3C illustrates a three-dimensional cube wherein the 6 faces recite certain encrypted data encoded as picture image.

Referring to FIG. 3C, Applicant's rotating cube 310 need not recite QR Code-type data. Any series of six images that when captured by a camera or scanning device disposed in customer computing device 150 generates pixel data for each of faces 345, 355, 365, 375, 385, and 395, can be displayed on rotating cube 310.

Figure 4:
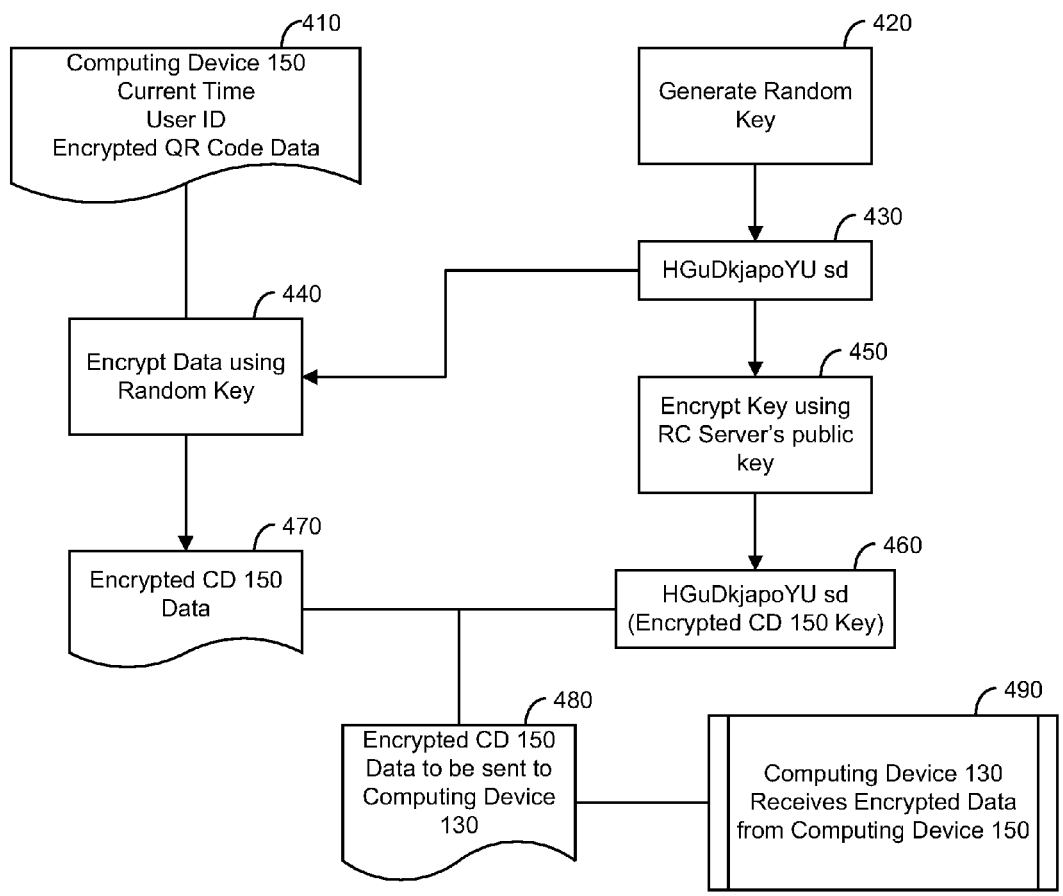
FIG. 4 summarizes a portion of Applicant's method wherein a customer computing device forms certain second encrypted data.

FIG. 4 summarizes the portion of Applicants method wherein a customer computing device 150 forms encrypted data to be provided to Applicant's authentication server 130. Referring now to FIG. 4, a customer computing device 150 comprises data 410 which includes a current time, a unique identifier 158, and the encrypted QR Code data 280.

In step 420, customer computing device 150 generates a random key. In step 440, customer computing device 150 utilizes the random key generated in step 420 to encrypt data 410 to generate encrypted data 470.

In step 450, customer computing device 150 encrypts the random key generated in step 420 using a public key 154 to generate an encrypted key 460.

In step 480, customer computing device 150 combines encrypted data 470 and encrypted key 460 to form encrypted data 480 to be sent to Applicant's authentication server 130. The encrypted computing data 480 includes the encrypted QR Code data 280 previously generated by merchant computing device 110.

In step 490, the customer computing device 150 provides the encrypted data 480 to Applicant's authentication server 130.

Figure 5:
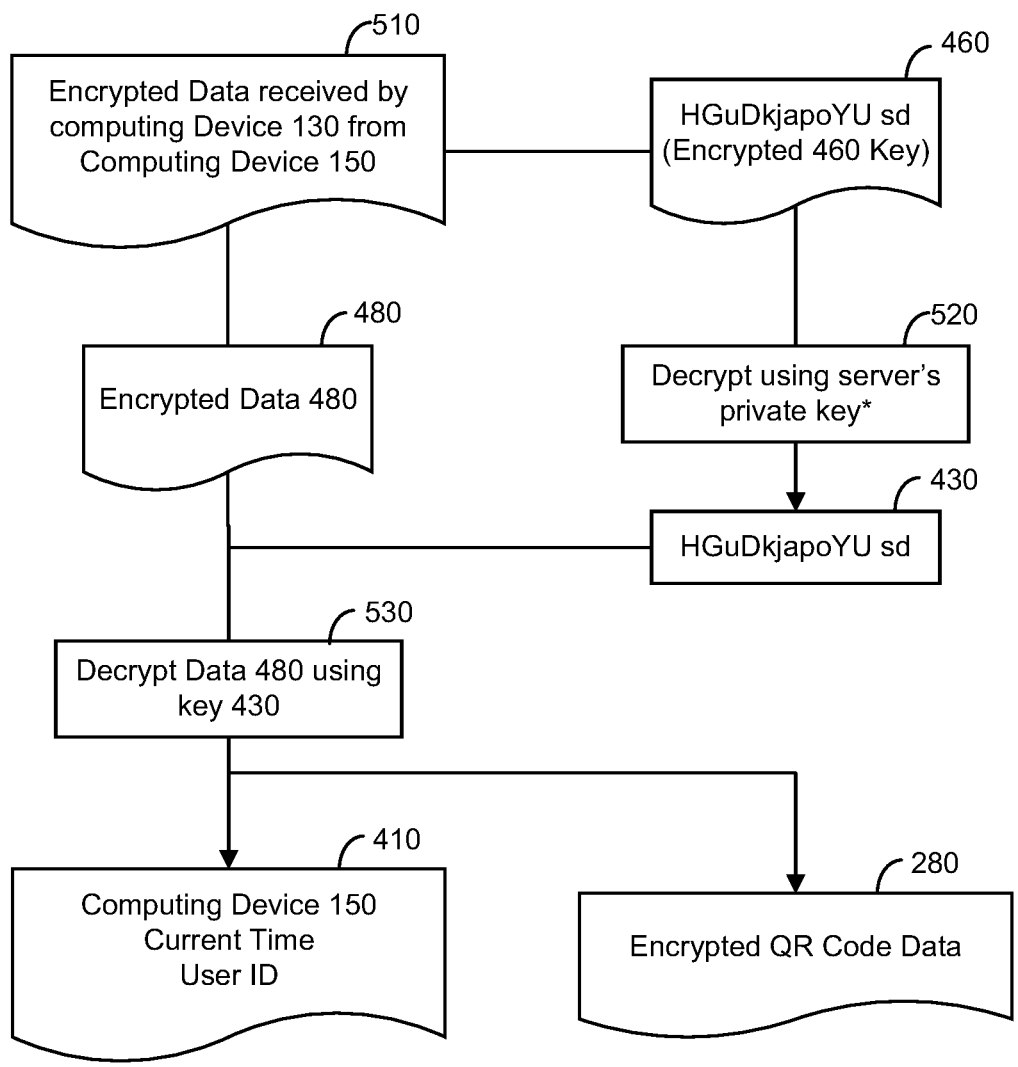
FIG. 5 summarizes a portion of Applicant's method wherein Applicant's authentication server decrypts the second encrypted data.

FIG. 5 summarizes the portion of Applicant's method wherein Applicant's authentication server 130 decrypts a portion of the encrypted data 480 received from customer computing device 150, wherein that encrypted data includes the encrypted QR code data 280.

In step 520, Applicant's authentication server 130 decrypts key 460 using the server's private key to form computing device random key 430. In step 530, Applicant's authentication server 130 utilizes random key 430 to decrypt previously encrypted data 480. Using random key 430, Applicant's authentication server 130 can reproduce data 410. Applicant's authentication server 130 cannot, however, reproduce data 210 using the decrypted random key 430.

Figure 6:
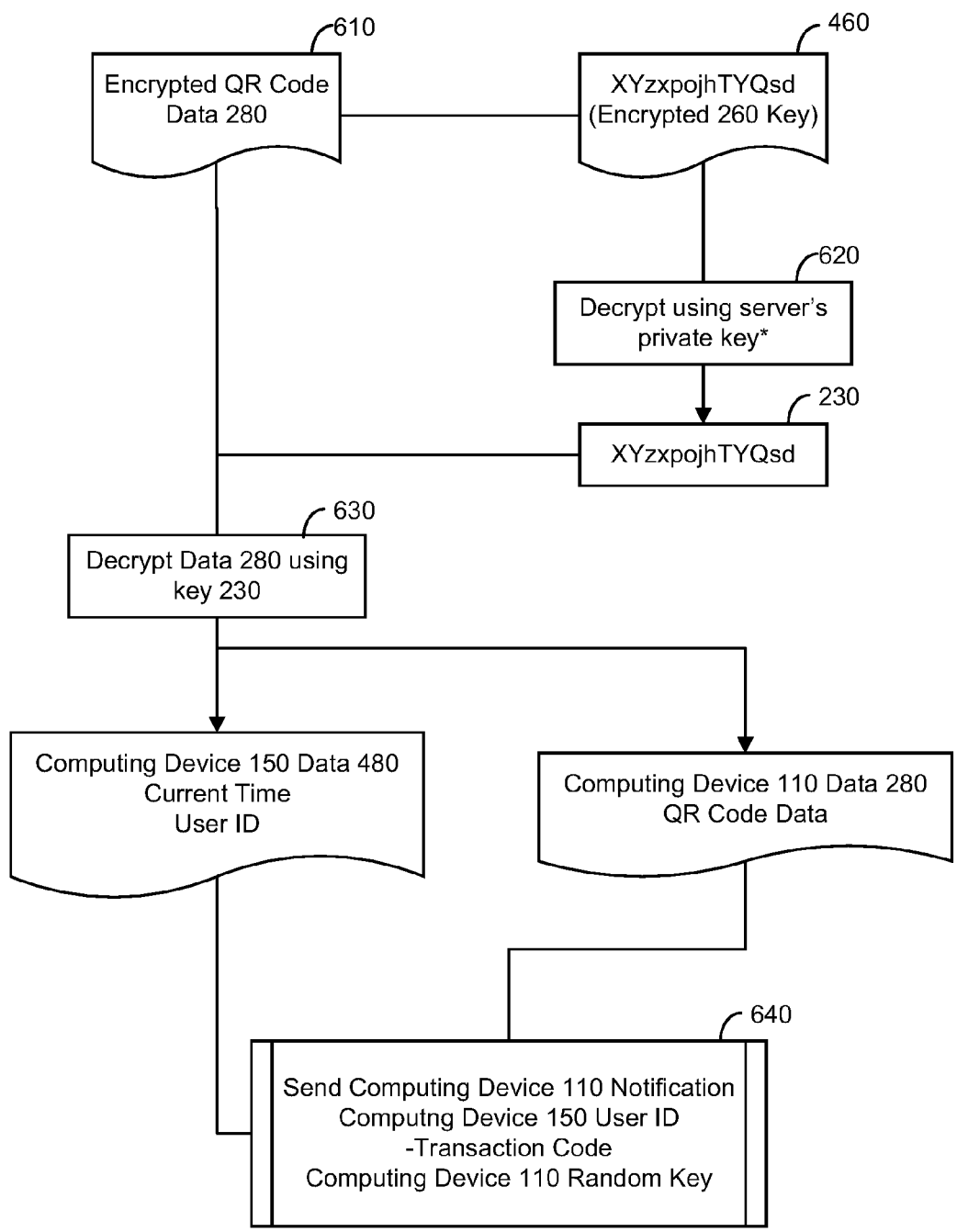
FIG. 6 summarizes a portion of Applicant's method wherein Applicant's authentication server decrypts the first encrypted data.

FIG. 6 summarizes the steps of Applicant's method to decrypt QR Code data scanned by customer computing device 150 from 3D cube 310. Referring now to FIG. 6, data 610 comprises QR Code data that Applicant's authentication server cannot decrypt using customer computing device 150 random key 430. In step 620, Applicant's authentication server decrypts the previous encrypted key 260 using the server's private key to reproduce merchant computing device 110 random key 230.

In step 630, Applicant's authentication server 130 utilizes random key 230 to decrypt the previously encrypted QR Code data 280. Applicant's server in FIG. 5 reproduces customer computing device data 410. Applicant's server in FIG. 6 reproduces merchant computing device data 210. In step 640, Applicant's authentication server provides Push Notice to merchant computing device 110, wherein that notification comprises customer computing device 150 User ID, merchant transaction code 199a, and merchant computing device random key 230.

Figure 7:
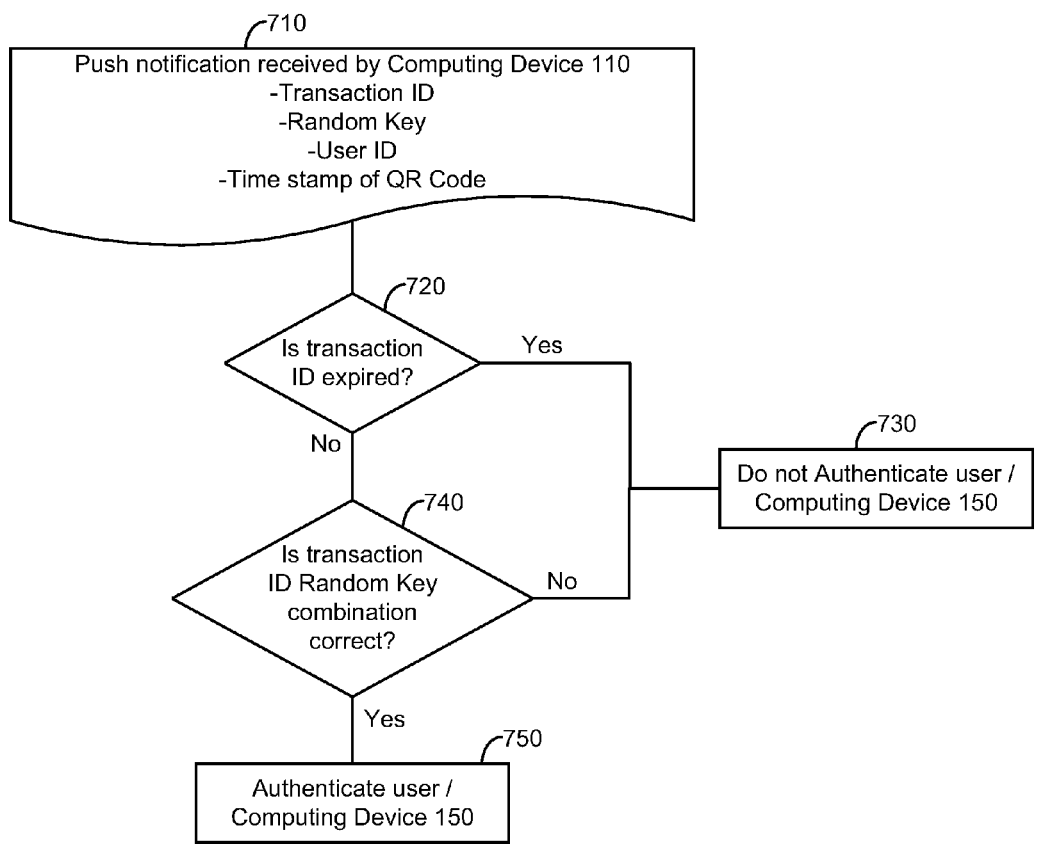
FIG. 7 summarizes a portion of Applicant's method wherein Applicant's authentication server provides the decrypted data of FIGS. 5 and 6 to merchant's computing device, and wherein the merchant's computing device determines whether to authenticate the customer computing device and the User thereof.

FIG. 7 summarizes the steps of Applicant's method wherein merchant computing device receives Push Notification from Applicant's authentication server, and determines whether to authenticate customer computing device 150 and the User thereof. Referring now to FIG. 7, in step 710 merchant computing device 110 receives Push Notification from Applicant's authentication server, wherein that Push Notification comprises Transaction ID 119a, merchant computing device 110 random code 230, the User's ID, and a time stamp of the QR code.

In step 720, merchant computing device 110 determines if the transaction ID has expired. If merchant computing device 110 determines in step 720 that the transaction ID received from Applicant's authentication server has expired, then the method transitions from step 720 to step 730 wherein merchant computing device 110 does not authenticate customer computing device 150.

Alternatively, if merchant computing device 110 determines in step 720 that the transaction ID received from Applicant's authentication server has not expired, then the method transitions from step 720 to step 740 wherein merchant computing device 110 determines if the Transaction ID and random key combination is correct. If merchant computing device determines in step 740 that the Transaction ID and random key combination is not correct, then the method transitions from step 740 to step 730 wherein merchant computing device 110 does not authenticate customer computing device 150 and the User thereof.

Alternatively, if merchant computing device determines in step 740 that the Transaction ID and random key combination is correct, then the method transitions from step 740 to step 750 wherein merchant computing device 110 authenticates customer computing device 150 and the User thereof.

In certain embodiments, Applicant's authentication system 100 includes an article of manufacture, such as Applicant's authentication server 130, comprising computer readable program code 137, encoded in a non-transitory computer readable medium, such as computer readable medium 133, where that computer readable program code can be executed by a processor, such as processor 132, to implement one or more of the steps of FIG. 2, FIG. 4, FIG. 5, FIG. 6, and/or FIG. 6.

In certain embodiments, Applicant's authentication system 100 comprises a computer program product, where that computer program product comprises computer readable program code comprises an "application" encoded in a merchant computing device 110, wherein that application can be executed by merchant computing device 110 to implement one or more of the steps of FIG. 2 and FIG. 7.

In certain embodiments, Applicant's authentication system 100 comprises a computer program product, where that computer program product comprises computer readable program code comprises an "application" encoded in a customer computing device 150, wherein that application can be executed by customer computing device 150 to implement one or more of the steps of FIG. 4.

In certain embodiments, Applicant's authentication system 100 comprises a computer program product, where that computer program product comprises computer readable program code comprises an "application" encoded in Applicant's authentication server 130, wherein that application can be executed by Applicant's authentication server 130 to implement one or more of the steps of FIG. 5 and/or FIG. 6.

In certain embodiments, the computer readable program code to implement the steps of FIGS. 2, 4, 5, 6, and 7, is encoded in a non-transitory computer readable medium comprising, for example, a magnetic information storage medium, an optical information storage medium, an electronic information storage medium, and the like. "Electronic storage media," means, for example and without limitation, one or more devices, such as and without limitation, a PROM, EPROM, EEPROM, Flash PROM, compactflash, smartmedia, and the like.

Examples of computer readable program code include, but are not limited to, micro-code or micro-instructions, machine instructions, such as produced by a compiler, code used to produce a web service, and files containing higher-level instructions that are executed by a computer using an interpreter. For example, embodiments are be implemented using Java, C++, or other programming languages (e.g., object-oriented programming languages) and development tools. Additional examples of computer code include, but are not limited to, control signals, encrypted code, and compressed code.

While the preferred embodiments of the present invention have been illustrated in detail, it should be apparent that modifications and adaptations to those embodiments may occur to one skilled in the art without departing from the scope of the present invention as set forth herein.

I claim:

1. An authentication method, comprising:
generating, on a merchant device, first encrypted data comprising an identifier for the merchant device, a first transaction identifier, and time, encrypted using a first randomly generated key;
encrypting the first randomly generated key using a public key to generate an encrypted key;
combining the encrypted key and the first encrypted data to generate an image code;
generating a video by skinning a cube with the image code on each face, and rotating the cube at a specific rate and a specific direction based upon time;
displaying the video on a display device for capture by a consumer device;
receiving, on an authentication server from the consumer's device, the first encrypted data encrypted generated using the first random key, wherein the first encrypted data includes the encryption time, an identifier for the consumer's device, encrypted merchant data encoded in the image, the rate of rotation and the direction of rotation, and wherein the encrypted merchant data encoded in the image includes a second random key encrypted using a second public key, and time, merchant identifier, and the first transactions identifier encrypted using the second random key;
decrypting, on an authentication server, the first random key using the first public key, the first encrypted data using the decrypted first random key, the second random key using the second public key, and the time, merchant identifier and the first transaction identifier using the decrypted second random key;
calculating, on an authentication server, a correct rate of rotation and direction of rotation using the decrypted time;
generating, on an authentication server, a push notification to the merchant system corresponding to the decrypted merchant identifier with the decrypted second random key, a second transaction identifier matching the decrypted first transaction identifier, and the identifier for the consumer's device when the calculated correct rate of rotation and direction of rotation match the received rate of rotation and direction of rotation;

receiving the push notification from the authentication server; and authenticating the consumer device if the first transaction identifier matches the second transaction identifier and the first randomly generated key matches the second key.

2. The method of claim 1, wherein the image code is a QR code.

3. The method of claim 1, wherein the public key is known to the authentication server.

4. The method of claim 1, wherein the time dependent specific rate of rotation and specific direction of rotation is known to the authentication server.

5. The method of claim 1, wherein the push notification includes a time stamp for the image code.

6. The method of claim 1, wherein the first encrypted data includes GPS information.

7. An article of manufacture comprising a non-transitory computer readable medium having computer readable program code encoded therein to perform authentication of a customer computing device located adjacent to a merchant computing device, the computer readable program code comprising a series of computer readable program steps to effect:

generating, on a merchant device, first encrypted data comprising an identifier for the merchant device, a first transaction identifier, and time encrypted using a first randomly generated key;

encrypting the first randomly generated key using a public key to generate an encrypted key;

combining the encrypted key and the first encrypted data to generate an image code;

generating a video by skinning a cube with the image code on each face, and rotating the cube at a specific rate and a specific direction based upon time;

displaying the video on a display device for capture by a consumer device;

receiving, on an authentication server from the consumer's device, the first encrypted data encrypted generated using the first random key, wherein the first encrypted data includes the encryption time, an identifier for the consumer's device, encrypted merchant data encoded in the image, the rate of rotation and the direction of rotation, and wherein the encrypted merchant data encoded in the image includes a second random key encrypted using a second public key, and time, merchant identifier, and the first transactions identifier encrypted using the second random key;

decrypting, on an authentication server, the first random key using the first public key, the first encrypted data using the decrypted first random key, the second random key using the second public key, and the time, merchant identifier and the first transaction identifier using the decrypted second random key;

calculating, on an authentication server, a correct rate of rotation and direction of rotation using the decrypted time;

generating, on an authentication server, a push notification to the merchant system corresponding to the decrypted merchant identifier with the decrypted second random key, a second transaction identifier matching the decrypted first transaction identifier, and the identifier for the consumer's device when the calculated correct rate of rotation and direction of rotation match the received rate of rotation and direction of rotation;

receiving the push notification from the authentication server; and authenticating the consumer device if the first transaction identifier matches the second transaction identifier and the first randomly generated key matches the second key.

8. The article of manufacture of claim 7, wherein the image code is a QR code.

9. The article of manufacture of claim 7, wherein the public key is known to the authentication server.

10. The article of manufacture of claim 7, wherein the time dependent specific rate of rotation and specific direction of rotation is known to the authentication server.

11. The article of manufacture of claim 7, wherein the push notification includes a time stamp for the image code.

12. The article of manufacture of claim 7, wherein the first encrypted data includes GPS information.

* * * * *